United States Patent
Li et al.

(10) Patent No.: US 10,814,260 B2
(45) Date of Patent: Oct. 27, 2020

(54) GAS-POWDER SEPARATION THREE-PHASE JET FLOW FIRE MONITOR SYSTEM

(71) Applicant: China University of Mining and Technology, Jiangsu (CN)

(72) Inventors: Beibei Li, Jiangsu (CN); Xiumei Liu, Jiangsu (CN); Jingjing Wang, Jiangsu (CN); Ruirui Li, Jiangsu (CN); Yaoda Yue, Jiangsu (CN); Jie He, Jiangsu (CN); Wei Li, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 16/349,276

(22) PCT Filed: Aug. 25, 2017

(86) PCT No.: PCT/CN2017/099115
§ 371 (c)(1),
(2) Date: May 13, 2019

(87) PCT Pub. No.: WO2019/028942
PCT Pub. Date: Feb. 14, 2019

(65) Prior Publication Data
US 2019/0344107 A1    Nov. 14, 2019

(30) Foreign Application Priority Data
Aug. 9, 2017   (CN) .......................... 2017 1 0674073

(51) Int. Cl.
*A62C 35/68*       (2006.01)
*B01D 45/16*       (2006.01)
(Continued)

(52) U.S. Cl.
CPC ............. *B01D 45/16* (2013.01); *B01D 45/12* (2013.01); *B05B 7/149* (2013.01); *B05B 7/1463* (2013.01); *B05B 7/1468* (2013.01); *A62C 35/68* (2013.01)

(58) Field of Classification Search
CPC ....... A62C 31/005; A62C 31/02; A62C 31/28; A62C 35/68; A62C 5/00–033;
(Continued)

(56) References Cited

U.S. PATENT DOCUMENTS 5,178,656 A * 1/1993 Schott .................... B01D 45/16
                                                                55/450
5,938,969 A * 8/1999 Morton ................ A62D 1/0014
                                                                252/4
(Continued)

FOREIGN PATENT DOCUMENTS

CN       201279361       7/2009
CN       201591228       9/2010
(Continued)

*Primary Examiner* — Alex M Valvis
*Assistant Examiner* — Juan C Barrera
(74) *Attorney, Agent, or Firm* — JCIPRNET

(57) ABSTRACT

The present invention discloses a gas-powder separation three-phase jet flow fire monitor system, including a gas-powder separation three-phase fire monitor head, a filter, a nitrogen pressurization apparatus and a dry powder tank. The dry powder tank is connected to a gas-powder mixture inlet pipe of the gas-powder separation three-phase fire monitor head through a pipeline. A nitrogen outlet pipe of the gas-powder separation three-phase fire monitor head is connected with one end of the nitrogen pressurization apparatus through the filter. The other end of the nitrogen pressurization apparatus is connected with the dry powder tank. The present invention is simple in structure and convenient to use. A cyclone separation apparatus of a dry powder pipeline of the fire monitor may separate nitrogen (Continued)

from conveyed ultrafine dry powder to enable the ultrafine dry powder to be fully mixed with a water-based fire extinguishing agent, thereby reducing an atomization degree of jet flow and enlarging a range of the fire monitor. In addition, the separated nitrogen enters the dry powder tank for recycling after being pressurized by the pressurization apparatus, thereby reducing the fire extinguishing cost.

7 Claims, 3 Drawing Sheets

(51) Int. Cl.
*B01D 45/12* (2006.01)
*B05B 7/14* (2006.01)

(58) Field of Classification Search
CPC .. A62C 35/00–68; B01D 45/12; B01D 45/16; B04C 9/00; B05B 7/1468; B05B 7/1472; B05B 7/1463; B05B 7/1431; B05B 7/1436; B05B 7/149
USPC .................................. 169/5–18, 44; 239/403
See application file for complete search history.

(56) References Cited

U.S. PATENT DOCUMENTS 6,174,339 B1 * 1/2001 Varady .................. B01D 45/12 55/348
6,267,803 B1 * 7/2001 Escobar ................ B01D 45/16 55/337
6,676,081 B2 * 1/2004 Grabow .................. A62C 3/08 169/46
8,251,227 B2 * 8/2012 Niccum ................ B01J 8/0055 209/133
9,630,037 B2 * 4/2017 Berghuijs ............ B01D 50/002

FOREIGN PATENT DOCUMENTS

CN 102078667 6/2011
CN 203736762 7/2014
CN 106994215 8/2017
RU 158632 1/2016

* cited by examiner

GAS-POWDER SEPARATION THREE-PHASE JET FLOW FIRE MONITOR SYSTEM

CROSS-REFERENCE TO RELATED APPLICATION

This application is a 371 of international application of PCT application serial no. PCT/CN2017/099115, filed on Aug. 25, 2017, which claims the priority benefit of China application no. 201710674073.2, filed on Aug. 9, 2017. The entirety of each of the abovementioned patent applications is hereby incorporated by reference herein and made a part of this specification.

FIELD OF THE INVENTION

The present invention relates to the technical field of fire fighting equipment, in particular to a gas-powder separation three-phase jet flow fire monitor system.

DESCRIPTION OF RELATED ART

With rapid development of the society, the total number of high-rise and large-space buildings in a city is increasing rapidly, and building structures tend to be complicated. If fire occurs in these complicated tall architectural forms, the fire and high-temperature toxic gas spread fast, which cause a great challenge to parking of fire fighting trucks and conveying of fire extinguishing agents during fire rescue. It has been a big problem in the fire fighting field to extinguish the fire in the complicated tall buildings.

In order to further improve the fire extinguishing efficiency, a three-phase jet flow fire extinguishing technology has become a research focus at home and abroad in recent years. The three-phase jet flow fire extinguishing technology is a novel fire extinguishing technology, which integrates advantages of various fire extinguishing agents. A research shows that by application of the three-phase jet flow fire extinguishing technology, various types of fire may be extinguished, and an extinguishing effect on petrochemical engineering fire is particularly outstanding. The so-called three-phase jet flow fire extinguishing technology is that a water-based fire extinguishing agent, aerosol-level ultrafine dry powder and an anti-reflash fire extinguishing agent are mixed for use to change physical and chemical characteristics of the fire extinguishing agents and improve the fire extinguishing efficiency of the fire extinguishing agents. The three-phase jet flow fire extinguishing technology is accepted and favored by the international fire community by virtue of its high environmental friendliness, high fire extinguishing efficiency, high safety, low destructiveness, high applicability and other characteristics. Therefore, many resources are put into researches on the three-phase jet flow fire extinguishing technology at home and abroad, and good achievements are made. The patent CN201110025420.1 discloses a three-phase jet flow fire extinguishing method. The POK (CHINA) FIRE FIGHTING EQUIPMENT CO., LTD has developed a high-flow dry powder and water/foam mixed fire monitor. The Mingguang Haomiao Security Protection Technology Corporation has researched and developed a three-phase jet flow fire fighting truck by applying various patent technologies. The three-phase jet flow fire extinguishing technology steps into an actual application stage.

A working principle of an existing three-phase jet flow fire monitor is that a fire extinguishing agent is conveyed through two paths. In one path, high-pressure nitrogen is used as power gas to convey the ultrafine dry powder from a dry powder tank to a muzzle. In the other path, a water pump conveys the water-based fire extinguishing agent to the muzzle. The two fire extinguishing agents are mixed at the concentric annular muzzle to form three-phase jet flow. However, the existing three-phase jet flow fire fighting technology ignores the influence of the nitrogen on the jet flow bundling property, and the existence of the high-pressure nitrogen greatly accelerates atomization of a jet flow water bundle, which seriously reduces the range of the fire monitor. In addition, loss of a large amount of nitrogen will inevitably lead to the increase of the fire fighting cost.

SUMMARY OF THE INVENTION

Technical Problem

In order to solve the above-mentioned problem, the present invention provides a gas-powder separation three-phase jet flow fire monitor system. The present invention is simple in structure and convenient to use. A cyclone separation apparatus of a dry powder pipeline in the fire monitor can separate nitrogen from conveyed ultrafine dry powder to enable the ultrafine dry powder to be fully mixed with a water-based fire extinguishing agent, thereby reducing an atomization degree of jet flow and enlarging a range of the fire monitor. In addition, the separated nitrogen enters the dry powder tank for recycling after being pressurized by a pressurization apparatus, thereby reducing the fire extinguishing cost.

Technical Solution

In order to achieve the above object, the present invention adopts the following technical measure:

The present invention provides a gas-powder separation three-phase jet flow fire monitor system, characterized by including a gas-powder separation three-phase fire monitor head, a filter, a nitrogen pressurization apparatus and a dry powder tank. The dry powder tank is connected to a gas-powder mixture inlet pipe of the gas-powder separation three-phase fire monitor head through a pipeline. A nitrogen outlet pipe of the gas-powder separation three-phase fire monitor head is connected with one end of the nitrogen pressurization apparatus through the filter. The other end of the nitrogen pressurization apparatus is connected with the dry powder tank.

The gas-powder separation three-phase fire monitor head includes a water monitor water feeding pipe, a gas-powder mixture inlet pipe, a water monitor pipe main body, the nitrogen outlet pipe, a two-stage cyclone separator and a gas-powder mixture right-angle elbow pipe. The water monitor water feeding pipe is arranged at a left end of the water monitor pipe main body and is connected with a fire fighting water pipe for conveying high-pressure water. The gas-powder mixture inlet pipe and the nitrogen outlet pipe are arranged at an upper end of the water monitor pipe main body, and are communicated with the inside of the water monitor pipe main body. The two-stage cyclone separator and the gas-powder mixture right-angle elbow pipe are arranged inside the water monitor pipe main body. One end of the gas-powder mixture right-angle elbow pipe is connected with the gas-powder mixture inlet pipe, and the other end of the gas-powder mixture right-angle elbow pipe is connected with the two-stage cyclone separator. A common outlet pipe of the two-stage cyclone separator is connected with the nitrogen outlet pipe.

Further, the two-stage cyclone separator consists of a primary separator and a secondary separator which are cascaded; the primary separator is an axial flow type cyclone separator and the secondary separator is a tangential reversing type cyclone separator. A particulate matter outlet of the primary separator is connected with an inlet of the secondary separator through a spiral pipe having a turning direction consistent with a rotating direction of gas flow in the two-stage cyclone separator. A gas outlet pipe of the two-stage cyclone separator is a T-shaped structural round pipe, and includes a primary separator nitrogen outlet pipe and a secondary separator nitrogen outlet pipe which are connected with each other, have equal apertures and are coaxial, the gas outlet pipe of the two-stage cyclone separator comprises the common outlet pipe and a gas isolation and rectification partition plate arranged at a middle part of the common outlet pipe. The common outlet pipe is connected with the nitrogen outlet pipe. The primary separator nitrogen outlet pipe and the secondary separator nitrogen outlet pipe are coaxial with the dry powder outlet pipe at a right end of the water monitor pipe main body.

Further, the water monitor water feeding pipe has a circular truncated cone-shaped structural appearance. A water inlet is formed in one side of a top of a circular truncated cone. A first interface flange is arranged at a bottom of the circular truncated cone. An appearance structure of the water monitor pipe main body is in a form of a cylinder and circular truncated cone combination. A left side of the water monitor pipe main body is provided with a second interface flange matched with the first interface flange. A right side of the water monitor pipe main body is of a circular truncated cone structure with a water outlet formed in the top of the circular truncated cone structure. The water monitor water feeding pipe and the water monitor pipe main body are connected through the first interface flange, the second interface flange and fastening bolts.

Further, an outlet in a lower part of the gas-powder mixture inlet pipe is connected with an inlet in an upper part of the gas-powder mixture right-angle elbow pipe through a thread. An outlet in a right side of the gas-powder mixture right-angle elbow pipe is welded together with an inlet in a left side of the two-stage cyclone separator. An inlet in a lower part of the nitrogen outlet pipe is connected with an outlet in an upper part of the common outlet pipe of the two-stage cyclone separator through a thread.

Further, a dry powder outlet pipe of the two-stage cyclone separator is of a circular truncated cone-shaped structure, and an outlet side has a relatively large diameter. A dry powder outlet and a water outlet form an annular water outlet with a gradually decreased flowing area, so that water sucks dry powder during jetting.

Further, an inlet end portion of the two-stage cyclone separator is provided with flow guide blades.

Further, flow rates of the filter and the nitrogen pressurization apparatus are greater than or equal to a flow rate of gas discharged from the nitrogen outlet pipe, and a working pressure of the nitrogen pressurization apparatus is greater than or equal to a gas pressure required by the dry powder tank.

Advantageous Effect

The present invention has the beneficial effects that:
on the basis of maintaining original functions of a three-phase jet flow fire monitor, separation of the nitrogen from the dry powder is realized, and an outstanding defect that the range is seriously reduced by an extremely high content of the high-pressure nitrogen, extremely high water jet flow impact and fast jet flow atomization during jetting of the three-phase jet flow fire monitor is overcome. In addition, recycling of the nitrogen is realized, and the fire extinguishing cost is reduced.

Figure 1:
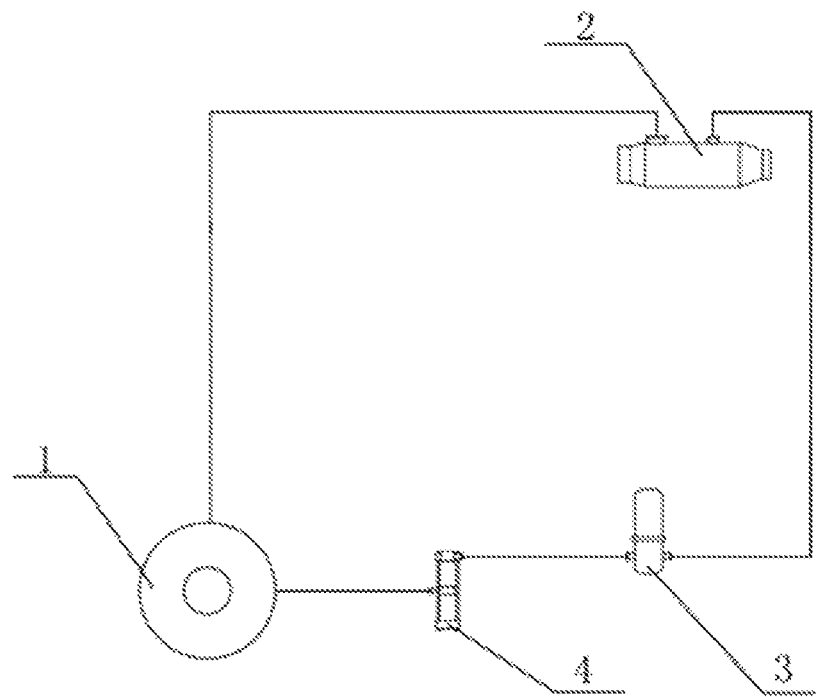
FIG. 1 is a schematic diagram of a gas-powder separation three-phase jet flow fire monitor system.
Figure 2:
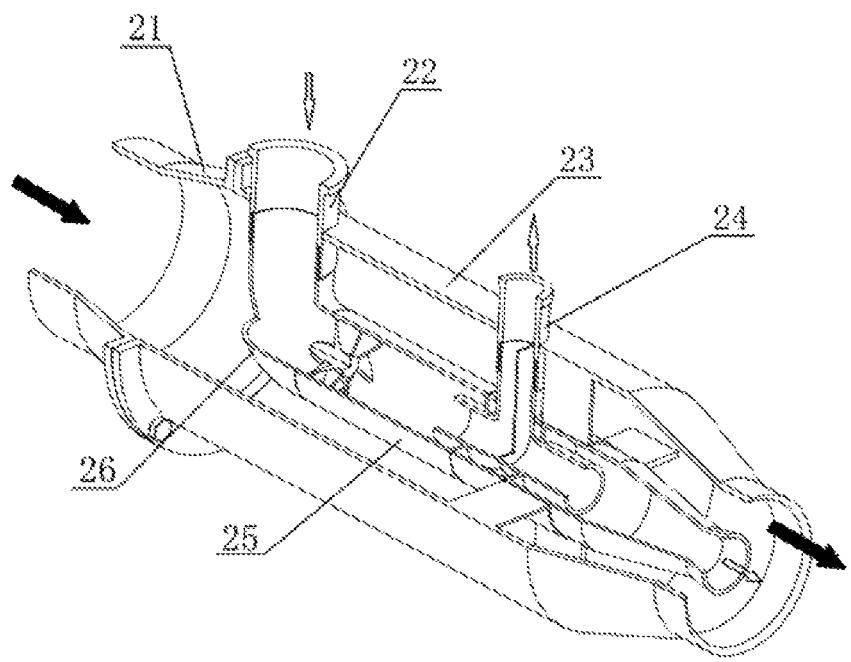
FIG. 2 is a half-sectional axonometric schematic diagram of a gas-powder separation three-phase jet flow fire monitor.
Figure 3:
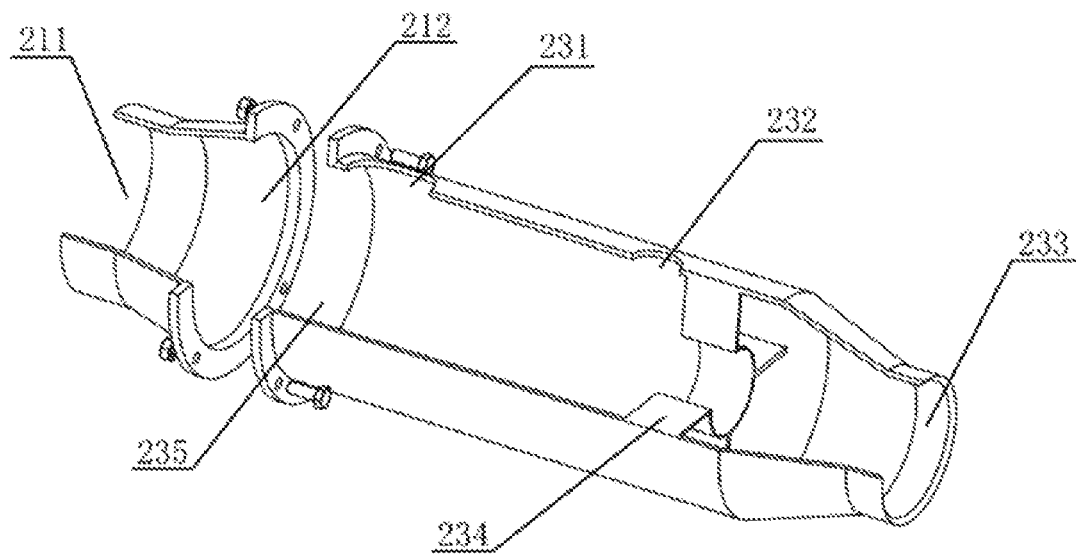
FIG. 3 is an exploded schematic diagram of a water monitor pipe.
Figure 4:
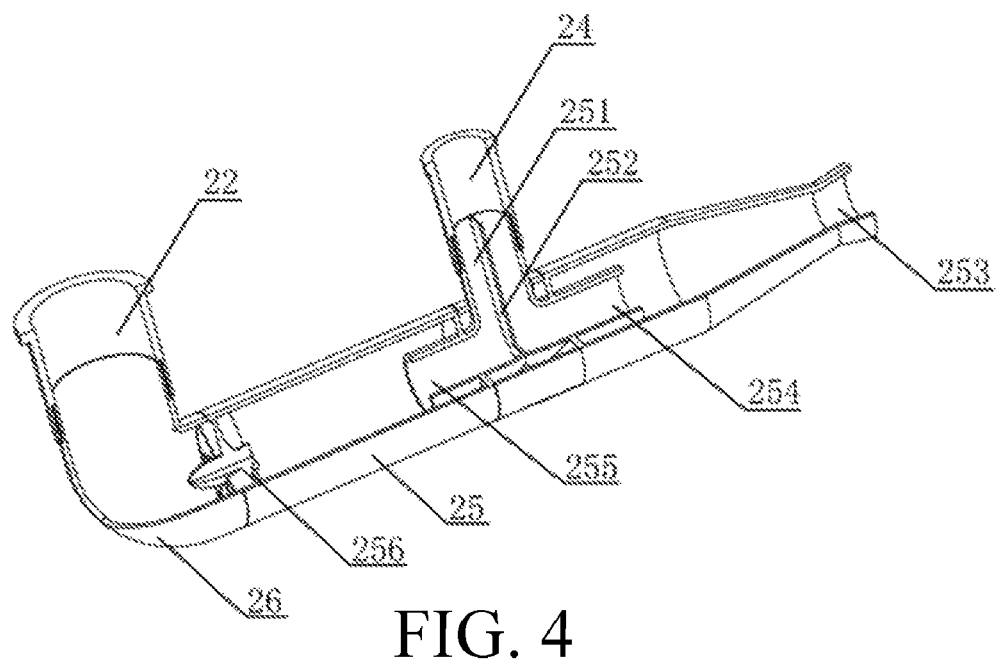
FIG. 4 is a half-sectional axonometric schematic diagram of a dry powder monitor pipe.
Figure 5:
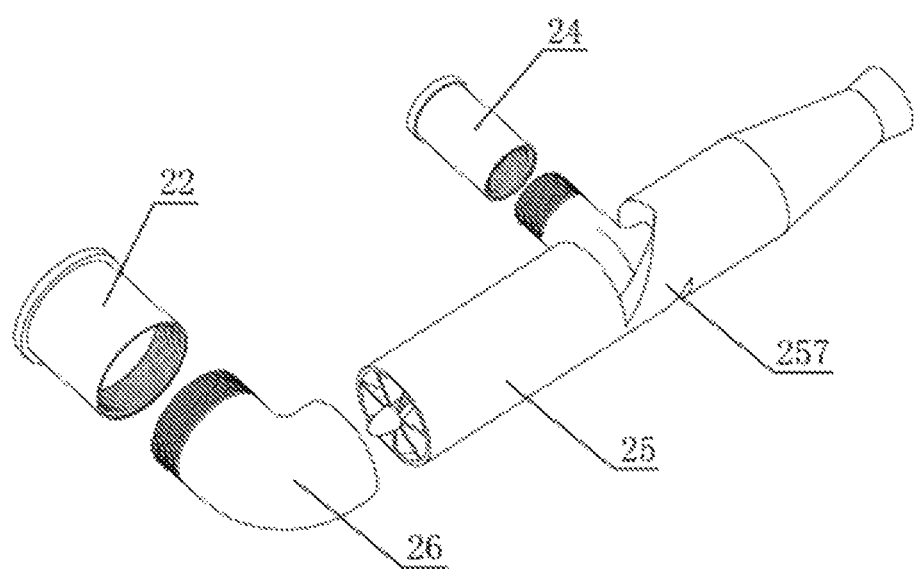
FIG. 5 is an exploded schematic diagram of a dry powder monitor pipe.

In the drawings: 1, dry powder tank; 2, gas-powder separation three-phase fire monitor head; 3, filter; 4, nitrogen pressurization apparatus; 21, water monitor water feeding pipe; 22, gas-powder mixture inlet pipe; 23, water monitor pipe main body; 24, nitrogen outlet pipe; 25, two-stage cyclone separator; 26, gas-powder mixture right-angle elbow pipe; 211, water inlet; 212, first interface flange; 231, gas-powder mixture inlet pipe mounting hole; 232, nitrogen outlet pipe mounting hole; 233, water outlet; 234, supporting frame; 235, second interface flange; 251, common outlet pipe; 252, partition plate; 253, dry powder outlet pipe; 254, secondary separator nitrogen outlet pipe; 255, primary separator nitrogen outlet pipe; 256, flow guide blade; and 257, spiral pipe.

DETAILED DESCRIPTION OF THE INVENTION

The present invention will be further described below in detail in combination with drawings and specific embodiments of the description, so that those skilled in the art can better understand the present invention and implement the present invention, but the described embodiments are not deemed as limiting the present invention.

Embodiment 1: as shown in FIG. 1, the present embodiment provides a three-phase jet flow fire monitor system, specifically including: a dry powder tank 1, a gas-powder separation three-phase fire monitor head 2, a filter 3 and a nitrogen pressurization apparatus 4. The dry powder tank 1 is connected to a gas-powder mixture inlet pipe of the fire monitor head 2 through a pipeline. A water tank and a water pump are connected to a water feeding pipe of a water monitor through a water conveying pipeline. The filter 3 and the nitrogen pressurization apparatus 4 are mounted between a nitrogen outlet pipe of the fire monitor head and the dry powder tank.

The three-phase fire monitor head includes a water monitor pipe and a gas-powder separation dry powder pipe. The water monitor pipe consists of a water monitor water feeding pipe 21 and a water monitor pipe main body 23. The water monitor water feeding pipe 21 has a circular truncated cone-shaped structural appearance. A water inlet 211 is formed in one side of a top of the circular truncated cone. A first interface flange 212 is arranged at a bottom of the circular truncated cone. The appearance structure of the water monitor pipe main body 23 is in a form of a cylinder and circular truncated cone combination, a left side of which is provided with a second interface flange 235 matched with the first interface flange 212. The top of the circular truncated cone on a right side of the water monitor pipe main body 23 is provided with a water outlet 233. A gas-powder mixture inlet pipe mounting hole 231 and a nitrogen outlet pipe mounting hole 232 are respectively formed in an upper part of the water monitor pipe main body 23, and are used for mounting a gas-powder mixture inlet pipe 22 and a nitrogen outlet pipe 24. One side, which is close to the circular truncated cone structure, inside the water monitor pipe main body 23 is provided with a supporting frame 234. The water monitor water feeding pipe 21 and the water monitor pipe main body 23 are assembled together through the first interface flange 212, the second interface flange 235 and fastening bolts.

The gas-powder separation pipe includes the gas-powder mixture inlet pipe 22, the nitrogen outlet pipe 24, a two-stage cyclone separator 25 and a gas-powder mixture right-angle elbow pipe 26. An outlet in a lower part of the gas-powder mixture inlet pipe 22 is assembled together with an inlet in an upper part of the gas-powder mixture right-angle elbow pipe 26 through a thread. An outlet in a right side of the gas-powder mixture right-angle elbow pipe 26 is welded together with an inlet in a left side of the two-stage cyclone separator 25. An inlet in a lower part of the nitrogen outlet pipe 24 is assembled together with an outlet in an upper part of the common outlet pipe 251 of the two-stage cyclone separator 25 through a thread. The two-stage cyclone separator 25 consists of an axial flow type cyclone separator (a primary separator) and a tangential reversing type cyclone separator (a secondary separator) which are cascaded, and an inlet end portion of the two-stage cyclone separator is provided with flow guide blades 256. A particulate matter outlet of the primary separator is connected with an inlet of the secondary separator through a spiral pipe 257 having a turning direction consistent with a rotating direction of gas flow in the two-stage cyclone separator. A gas outlet pipe of the two-stage cyclone separator 25 is a T-shaped structural round pipe, and includes a primary separator nitrogen outlet pipe 255 and a secondary separator nitrogen outlet pipe 254 which are connected with each other, have equal apertures and are coaxial, a common outlet pipe 251 and a gas isolation and rectification partition plate 252 arranged at a middle part of the common outlet pipe 251. The two-stage cyclone separator 25 is mounted inside the water monitor pipe main body 23 through the gas-powder mixture inlet pipe 22, the nitrogen outlet pipe 24 and the supporting frame 234, and is coaxial with the water monitor pipe main body 23. The dry powder outlet pipe 253 is of a circular truncated cone-shaped structure, and an outlet side has a relatively large diameter. The dry powder outlet pipe 253 and the water outlet 233 form an annular water outlet with a gradually decreased flowing area, so that water sucks dry powder during jetting.

During single jetting of a water-based fire extinguishing agent, the water-based fire extinguishing agent from a fire fighting truck is conveyed into the water monitor pipe through a water pump, and annular jet flow is jetted out from an annular channel formed by the water outlet and the dry powder pipeline. As a powder discharging end of the two-stage cyclone separator has a certain taper angle, a runner at an outlet has a certain expansion angle, and the jet flow is jetted out in a contracted cone form after being reflected by an inner surface of a nozzle of the water monitor pipe, and then is gathered in front of the monitor head to form columnar jet flow, so as to realize long-distance jet fire extinguishment.

During combined jetting of fire extinguishing agents, the water-based fire extinguishing agent from the fire fighting truck is conveyed into the water monitor pipe through a water pump, and annular jet flow is jetted out from an annular channel formed by the water outlet and the dry powder pipeline. As a runner at an outlet of the powder discharging end of the two-stage cyclone separator has a certain expansion angle, the jet flow is jetted out in the contracted cone form after being reflected by the inner surface of the nozzle of the water monitor pipe, and then is gathered in front of the monitor head to form columnar jet flow. An ultrafine dry powder fire extinguishing agent from the fire fighting truck is conveyed into the gas-powder mixture inlet pipe of the fire monitor under the driving of nitrogen, and is separated through the two-stage cyclone separator. The ultrafine dry powder and a small amount of nitrogen are jetted out in a spinning manner from a powder outlet of the cyclone separator, then collide with the inside of a contracted cavity formed by the annular jet flow of the water-based fire extinguishing agent in front of the monitor head, and are mixed with the annular jet flow to form mixed jet flow for long-distance jet fire extinguishment. The separated nitrogen is output from the cyclone separator through a gas discharging pipeline, and is filtered through the filter. The filtered nitrogen is pressurized through the nitrogen pressurization apparatus and then is directly conveyed into the dry powder tank for conveying of the ultrafine dry powder.

It should be understood that those ordinarily skilled in the art can make improvements or changes according to the above-mentioned descriptions, and all these improvements and changes shall fall within the protection scope of attached claims of the present invention.

What is claimed is:

1. A gas-powder separation three-phase jet flow fire monitor system, comprising a gas-powder separation three-phase fire monitor head, a filter, a gas pressurization apparatus and a dry powder tank, wherein the dry powder tank is connected to a gas-powder mixture inlet pipe of the gas-powder separation three-phase fire monitor head through a pipeline, a gas outlet pipe of the gas-powder separation three-phase fire monitor head is connected with one end of the gas pressurization apparatus through the filter, and the other end of the gas pressurization apparatus is connected with the dry powder tank; and the gas-powder separation three-phase fire monitor head comprises a water monitor water feeding pipe, the gas-powder mixture inlet pipe, a water monitor pipe main body, the gas outlet pipe, a two-stage cyclone separator and a gas-powder mixture right-angle elbow pipe, the water monitor water feeding pipe is arranged at an upstream side of the water monitor pipe main body and is configured for connecting to a fire fighting water pipe for conveying high-pressure water, the gas-powder mixture inlet pipe and the gas outlet pipe are arranged at an upper end of the water monitor pipe main body, and are communicated with inside of the water monitor pipe main body, the two-stage cyclone separator and the gas-powder mixture right-angle elbow pipe are arranged inside the water monitor pipe main body, one end of the gas-powder mixture right-angle elbow pipe is connected with the gas-powder mixture inlet pipe, the other end of the gas-powder mixture right-angle elbow pipe is connected with the two-stage cyclone separator, and a common outlet pipe of the two-stage cyclone separator is connected with the gas outlet pipe.

2. The gas-powder separation three-phase jet flow fire monitor system according to claim 1, wherein the two-stage cyclone separator consists of a primary separator and a secondary separator which are cascaded; the primary separator is an axial flow type cyclone separator and the secondary separator is a tangential reversing type cyclone separator; a spiral pipe and a T-shaped pipe are provided between the primary separator and the secondary separator, the spiral pipe has a turning direction consistent with a rotating direction of gas flow in the two-stage cyclone separator, the T-shaped pipe comprises a primary separator gas outlet pipe and a secondary separator gas outlet pipe which are connected with each other, have equal apertures and are coaxial, the T-shaped pipe of the two-stage cyclone separator comprises the common outlet pipe and a gas isolation and rectification partition plate arranged at a middle part of the common outlet pipe, the common outlet pipe is connected with the gas outlet pipe, and the primary separator gas outlet pipe and the secondary separator gas outlet pipe are coaxial with a dry powder outlet pipe at a downstream side of the two-stage cyclone separator.

3. The gas-powder separation three-phase jet flow fire monitor system according to claim 1, wherein the water monitor water feeding pipe has a circular truncated cone-shaped structural appearance, a water inlet is formed in a truncated side of the water monitor water feeding pipe, a first interface flange is arranged at another side opposite to the truncated side of the water monitor water feeding pipe, an appearance structure of the water monitor pipe main body is in a form of a cylinder and circular truncated cone combination, an upstream side of the water monitor pipe main body is provided with a second interface flange matched with the first interface flange, a downstream side of the water monitor pipe main body is of a circular truncated cone structure with a water outlet formed in a truncated side of the circular truncated cone structure, and the water monitor water feeding pipe and the water monitor pipe main body are connected through the first interface flange, the second interface flange and fastening bolts.

4. The gas-powder separation three-phase jet flow fire monitor system according to claim 1, wherein an outlet in a lower part of the gas-powder mixture inlet pipe is connected together with an inlet in an upper part of the gas-powder mixture right-angle elbow pipe through a thread; an outlet in a downstream side of the gas-powder mixture right-angle elbow pipe is welded together with an inlet in an upstream side of the two-stage cyclone separator; and an inlet in a lower part of the gas outlet pipe is connected with an outlet in an upper part of the common outlet pipe of the two-stage cyclone separator through a thread.

5. The gas-powder separation three-phase jet flow fire monitor system according to claim 1, wherein a dry powder outlet pipe of the two-stage cyclone separator is of a circular truncated cone-shaped structure, an outlet side has a relatively large diameter, and a dry powder outlet and a water outlet form an annular water outlet with a gradually decreased flowing area, so that water sucks dry powder during jetting.

6. The gas-powder separation three-phase jet flow fire monitor system according to claim 1, wherein an inlet end portion of the two-stage cyclone separator is provided with flow guide blades.

7. The gas-powder separation three-phase jet flow fire monitor system according to claim 1, wherein flow rates of the filter and the gas pressurization apparatus are greater than or equal to a flow rate of gas discharged from the gas outlet pipe, and a working pressure of the gas pressurization apparatus is greater than or equal to a gas pressure required by the dry powder tank.

* * * * *